United States Patent [19]

Cunningham et al.

[11] Patent Number: 5,365,437
[45] Date of Patent: Nov. 15, 1994

[54] INTERNAL LINE HYDRAULIC FLUID PRESSURE TRANSMISSION RECALIBRATION UNIT

[75] Inventors: Peter T. Cunningham; James H. Rowlee, both of Pasadena, Calif.

[73] Assignee: Gale Banks Engineering, Azusa, Calif.

[21] Appl. No.: 725,058

[22] Filed: Jul. 2, 1991

[51] Int. Cl.⁵ .................. G06F 15/20; B60K 41/08
[52] U.S. Cl. ................... 364/424.1; 307/118
[58] Field of Search ........... 364/424.1; 74/866, 862, 74/865, 869, 860; 307/118, 308, 130, 121, 418, 33

[56] References Cited

U.S. PATENT DOCUMENTS

| | | | |
|---|---|---|---|
| 3,732,753 | 5/1973 | Olsen et al. | 74/866 |
| 4,388,845 | 6/1983 | Kishi et al. | 74/862 |
| 4,488,456 | 12/1984 | Taga et al. | 74/866 |
| 4,611,285 | 9/1986 | Weisman, II | 364/424.1 |
| 4,791,568 | 12/1988 | Hiramatsu et al. | 364/424.1 |
| 4,840,263 | 6/1989 | Kato et al. | 192/109 F |
| 4,953,090 | 8/1990 | Narita | 364/424.1 |
| 4,956,776 | 9/1990 | Carre | 364/424.1 |
| 4,982,822 | 7/1991 | Petzold et al. | 74/866 |
| 4,991,097 | 2/1991 | Fodale et al. | 364/424.1 |
| 5,010,974 | 4/1991 | Matsuda | 364/424.1 |
| 5,052,246 | 10/1991 | Yamaguchi | 364/424.1 |
| 5,062,049 | 10/1991 | Taylor | 364/424.1 |
| 5,062,050 | 10/1991 | Petzold et al. | 364/424.1 |
| 5,074,166 | 12/1991 | Yamashita et al. | 364/424.1 |
| 5,075,860 | 12/1991 | Suzuki | 364/424.1 |
| 5,136,495 | 8/1992 | Tokoro et al. | 364/424.1 |
| 5,175,685 | 12/1992 | Hibi | 364/424.1 |

Primary Examiner—Thomas G. Black
Assistant Examiner—Tan Q. Nguyen
Attorney, Agent, or Firm—Lyon & Lyon

[57] ABSTRACT

An electronic device for modifying the calibration of the electronic control system of a modern electronic transmission. An analog processor monitors an electrical current indicating the internal line hydraulic fluid pressure of the transmission and the throttle output of an engine associated with the transmission to detect deficiencies in the internal line hydraulic fluid pressure of the transmission. Further, upon the detection of deficiencies in the internal line hydraulic fluid pressure, the analog processor alters the electronic feedback between the electronic control system and an electronic pressure valve responsible for regulating the internal line hydraulic fluid pressure to increase the internal line hydraulic fluid pressure.

9 Claims, 3 Drawing Sheets

INTERNAL LINE HYDRAULIC FLUID PRESSURE TRANSMISSION RECALIBRATION UNIT

BACKGROUND OF THE INVENTION

The field of the invention is electronic transmission control systems for automotive vehicles, and more specifically, devices which adjust the operating parameters of electronic transmission control systems.

Generally, an electronic transmission for an automotive vehicle such as a passenger car or small truck comprises a gear mechanism and an electronic control system. The gear mechanism is constructed to provide, in response to electrical signals received from the electronic control system, a plurality of rotational speed ratios between a power input shaft and a power output shaft. The precise rotational speed ratio provided by the gear mechanism is determined by selectively coupling various pairs of friction engaging mechanisms comprised within the gear mechanism, such as hydraulically activated clutches. To apply hydraulic fluid pressure to a particular pair of friction engaging mechanisms the electronic control system activates an electronic switching valve associated with each friction engaging mechanism. The electronic switching valves in turn cause pressure from a hydraulic pressure source (internal line hydraulic fluid pressure) to be applied to the friction engaging mechanisms, thus causing the components of such mechanisms to be pressed together in a fluid medium. As the components move toward each other in the fluid medium, friction results between them, thus causing them to communicate and eventually to couple.

It follows that to maximize efficiency during gear shifts and to minimize deterioration of the friction engaging mechanisms during operation, electronic control systems are advantageous for regulation of the coupling of friction engaging mechanisms. This is also true for maximizing drivability. For example, if the friction engaging mechanisms couple too quickly (if too much hydraulic fluid pressure is applied to the friction engaging mechanisms), gear shifting will occur in a jerky fashion and the shock resulting from the coupling can be unpleasant and in extreme cases could result in damage to the transmission as well as to other components of the vehicle drive train. On the other hand, if the coupling takes place too slowly (if insufficient hydraulic fluid pressure is applied to the friction engaging mechanisms), excessive slip and, therefore, wear may occur between the friction engaging mechanisms.

To insure smooth shifting and efficient coupling of the friction engaging mechanisms, conventional electronic transmissions utilize an electronic pressure valve to adjust the internal line hydraulic fluid pressure of the gear mechanism. Typically, the electronic pressure valve adjusts the internal line hydraulic fluid pressure in proportion to an electrical current emitted by the electronic control system. The amount of emitted current, and hence the internal line hydraulic fluid pressure, is generally determined by the electronic control system based on a number of factors which indicate the load placed on an engine associated with the transmission. These factors often include the throttle or accelerator output, the acceleration of the vehicle, the amount of torque desired between the friction engaging mechanisms, and the timing of any gear shifts.

The changes in the internal line hydraulic fluid pressure produced by these factors may be summarized as follows. When the engine associated with the transmission operates at idle output, the electronic control system sets the internal line hydraulic fluid pressure at a very low level; and the frictional communication between the friction engaging mechanisms is minimized. As the output of the engine increases, the electronic control system raises the internal line hydraulic fluid pressure, the frictional communication between the friction engaging mechanisms increases, and eventually sufficient torque is applied to the transmission output shaft to cause the shaft to rotate and the vehicle to accelerate. As the vehicle accelerates, the difference between the rotational speeds of the friction engaging mechanisms decreases, and the hydraulic pressure required to hold the friction engaging mechanism together is reduced. It should be noted that during gear shifts similar changes in the internal line hydraulic fluid pressure are desired because a new pair of friction engaging mechanisms must be brought together.

Because most conventional electronic control systems control internal line hydraulic fluid pressure based at least in part on engine load interpreted as a function of throttle output and acceleration, modifying the power output of an engine may result in regulation of the internal line hydraulic fluid pressure based on incorrect load assumptions. When a performance enhancement device is added to an engine, the power generated by the engine increases, and the throttle position required to carry a given load is reduced. Consequently, the electronic control system may incorrectly perceive that the engine is carrying a reduced load. In response to the perceived load reduction, the electronic control system may reduce the internal line hydraulic fluid pressure of the transmission where the load actually was not reduced. Such systems also do not adequately account for situations where firmer shifting is desireable even with unmodified engine power, such as when pulling a trailer.

SUMMARY OF THE INVENTION

The present invention is directed to an electronic device for modifying the calibration of the electronic control system of a modern electronic transmission. In one aspect cf the present invention, the electronic control system uses constant current control in a closed loop logic system such that for a selected condition, current, rather than voltage, is maintained at a constant value. In order to recalibrate the internal line hydraulic fluid pressure of the transmission without altering the program of the electronic control system, a variable portion of the control current emanating from the electronic control system is diverted such that an altered current is directed to the electronic pressure valve and then reformed for return to the electronic control system. Thus, the electronic control system is used to control operation of the transmission while the actual signal from the electronic control system to the electronic pressure valve is altered to increase internal line hydraulic fluid pressure under appropriate conditions. In addition, the invention contemplates the method for accomplishing the foregoing.

In a preferred form, a signal processor monitors an electrical current emitted by the electronic control system which current is intended to control the internal line hydraulic fluid pressure of the transmission. It may also monitor the throttle output of the engine associated with the transmission. This monitoring provides an understanding of conditions within the transmission as well as the power load on the transmission without the necessity of measuring internal line hydraulic fluid pressure within the transmission. Upon determining conditions affecting transmission operation, the signal processor alters the electronic current emanating from the electronic control system so as to provide an altered current to an electronic pressure valve which regulates the internal line hydraulic fluid pressure in the transmission. This alteration causes the electronic pressure valve to increase the transmission's internal line hydraulic fluid pressure so as to provide a firmer shift. Such an altered shift may be advantageously employed, for example, in vehicles where the engine has been modified to increase power or where additional loads such as a trailer are imposed on either an unmodified or modified vehicle.

Accordingly, it is an object of the present invention to provide a device which alters the output characteristics of a transmission electronic control system to the electronic pressure valve to adjust the internal line hydraulic fluid pressure of an electronic transmission.

It is a further object of the present invention to provide a method for adjusting the operating parameters of a transmission's electronic control system to adjust the internal line hydraulic fluid pressure of the transmission.

Figure 1:
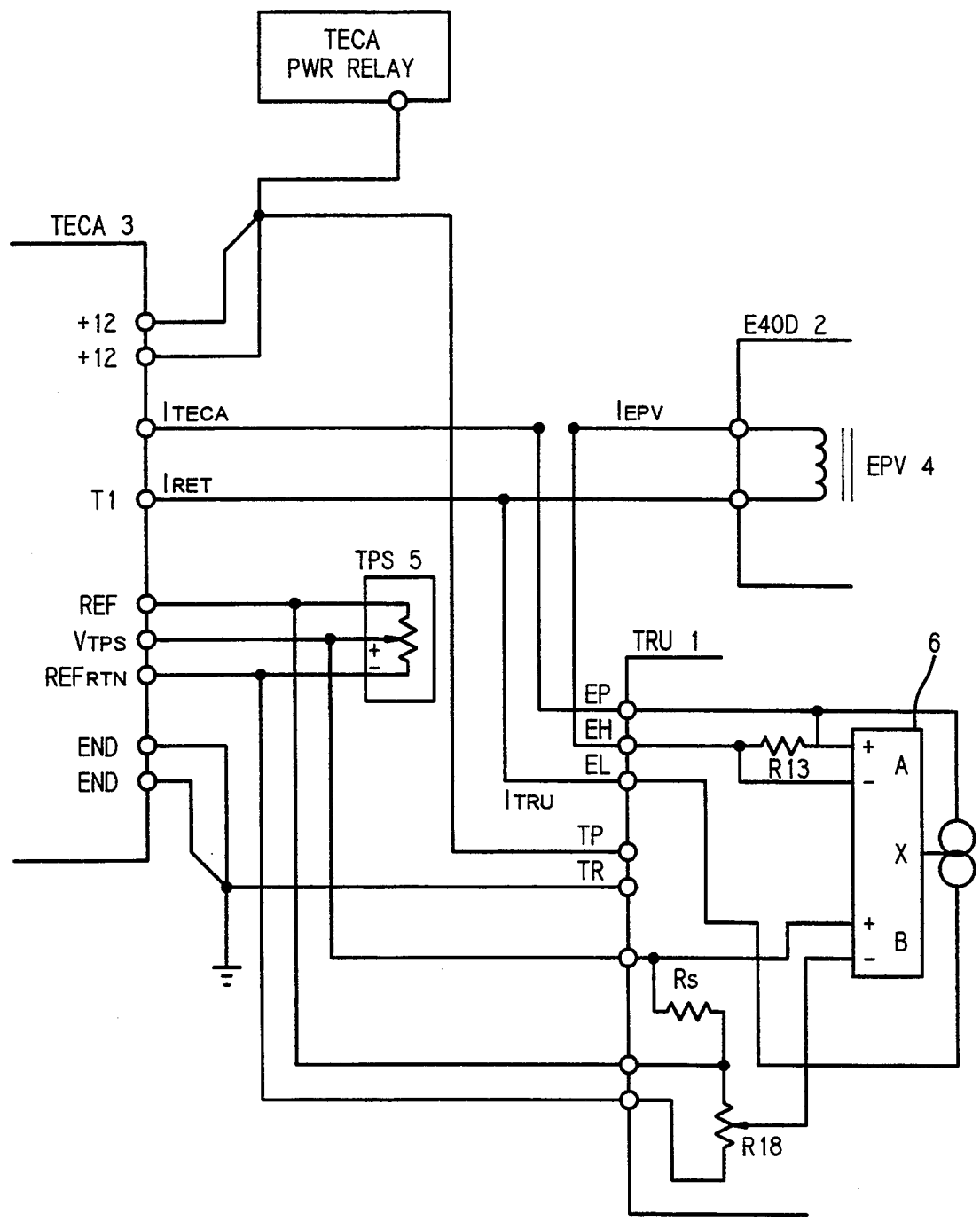
FIG. 1 is a schematic block diagram of a Ford Motor Company electronic, 4 speed, overdrive transmission (E40D) employing an embodiment of the present invention.

While the invention is susceptible to various modifications and alternative forms, specific examples thereof have been shown by way of example in the drawings and are herein described in detail. It should be understood, however, that it is not intended to limit the invention to the particular forms disclosed, but on the contrary, the invention is to cover all modifications, equivalents, and alternatives falling within the spirit and scope of the invention as defined by the appended claims.

DESCRIPTION OF THE PREFERRED EMBODIMENT

Turning in detail to the drawings, FIG. 1 illustrates the interaction between a transmission recalibration unit (hereinafter TRU) 1 and a Ford Motor Company electronic, 4 speed, overdrive transmission (hereinafter E40D). The E40D comprises a gear mechanism 2 and a transmission electronic control assembly 3 (hereinafter TECA) (a microprocessor based electronic control system as is well known in the art). The gear mechanism 2 is constructed to provide in response to electrical signals received from the TECA 3 a plurality of rotational speed ratios between a power input shaft and a power output shaft (not shown). The precise rotational speed ratio provided by the gear mechanism 2 is determined by selectively coupling various pairs of friction engaging mechanisms comprised within the gear mechanism, such as hydraulically activated clutches. To apply hydraulic fluid pressure to a particular pair of friction engaging mechanisms, the TECA 3 activates electronic switching valves associated with friction engaging mechanisms. The electronic switching valves in turn cause pressure from a hydraulic pressure source (internal line hydraulic fluid pressure) to be applied to the friction engaging mechanisms, thus causing the friction engaging mechanisms to be pressed together in a liquid medium. As elements of a friction engaging mechanism move toward each other in the fluid medium, friction results between them causing them to communicate and eventually to couple.

To insure smooth shifting and efficient coupling of the friction engaging mechanisms, the E40D utilizes an electronic pressure valve (hereinafter EPV) 4 to adjust the internal line hydraulic fluid pressure of the gear mechanism 1. The EPV 4 adjusts the internal line hydraulic fluid pressure in proportion to an electrical current $I_{EPV}$. It should be noted that the EPV 4 varies the internal line hydraulic fluid pressure of the E40D inversely in proportion to the current $I_{EPV}$. Thus, as current passing through the EPV 4 decreases, the internal line hydraulic fluid pressure of the E40D increases. For example, when an engine associated with the E40D operates at idle speed, $I_{EPV}$ typically is 1 amp of current to the EPV 4, and the EPV 4 adjusts the fluid pressure to 60 psi. If $I_{EPV}$ is reduced to 0 amps, the EPV 4 will adjust the internal line hydraulic fluid pressure to roughly 180 psi.

The TECA 3 determines and emits an amount of current $I_{TECA}$. This current $I_{TECA}$ is directed to the TRU 1 to vary the internal line hydraulic fluid pressure of the E40D, based on a number of factors which indicate the load placed on an engine associated with the E40D. These factors include the throttle or accelerator position sensor (hereinafter TPS) 5, changes in the speed of the engine in relation to the TPS output, and the timing of any gear shifts. The TRU I diverts a portion of the current $I_{TECA}$ from the TECA 3 under certain load conditions so as to provide a reduced current $I_{EPV}$ to the EPV 4 which in turn increases the internal line hydraulic fluid pressure.

If the control current from the TECA 3 is not modified in accordance with the present invention, the TECA 3 would control the internal line hydraulic fluid pressure based at least in part on perceived engine load which the TECA 3 interprets as a function of the TPS output and acceleration. However, when an engine is modified to enhance power output, improper regulation of the internal line hydraulic fluid pressure may occur because the TPS output and acceleration no longer reflect unmodified power curve assumptions. For instance, when a turbo charger is added to the engine, the power generated by the engine increases, and the TPS output required to carry a given load is reduced. Consequently, the TECA 3 may incorrectly perceive that the engine is carrying a reduced load. In response to this perceived load reduction, the TECA 3 may emit excess current $I_{TECA}$ at a given load, which in turn would cause the EPV 4 to reduce the internal line hydraulic fluid pressure of the E40D. Thus, the TRU 1 is introduced to reduce the amount of current directed to the EPV 4 ($I_{EPV}$) at a given load.

The TECA 3 emits a current $I_{TECA}$ which is directed to the TRU 1 and then directed in turn to the EPV 4 in a selectively modified or unmodified condition as current $I_{EPV}$. The current $I_{TECA}$ is determined by such parameters as the TPS output and the rate of vehicle acceleration. Through feedback control as monitored through the $I_{RET}$, the TECA 3 maintains a current signal independent of load. The magnitude of this signal at any point in time is determined by vehicle and transmission conditions but this signal does not vary, in steady state, as a function of the load in the EPV circuit. The TRU 1 utilizes the $I_{TECA}$ control current signal and its feedback relationship for control of the EPV 4 with selective decreases in that current signal to increase internal line hydraulic fluid pressure. By shunting a portion of the current $I_{TECA}$ from the TECA 3 around the EPV 4 through the TRU 1, and to the return current $I_{RET}$ the TRU 1 causes the TECA 3 to sense no change in the feedback of current. Therefore, the TECA 3 continues to respond to its inputs without change. However, the current $I_{EPV}$ to the EPV 4 is reduced. As the TRU 1 reduces the current $I_{EPV}$, the EPV 4 raises the fluid pressure in the transmission to a level appropriate for the load. Thus, the TRU 1 provides a variable shunt mechanism responsive at least in part to TECA 3 current $I_{TECA}$ to control current to the EPV 4.

Although in the preferred form the TRU 1 alters the current received by the EPV 4 by shunting current around the EPV 4, it should be noted that the current received by the EPV 4 may be altered by alternative methods. For example, an inductor similar to the EPV 4 might be implemented in parallel with the EPV 4 to divert current from the EPV 4.

In a preferred form, the TRU 1 monitors both the amount of current $I_{TECA}$ emitted from the TECA 3 and the output voltage $V_{TPS}$ generated by the TPS sensor 5 to compensate for increased load conditions by increasing internal line hydraulic fluid pressures of the E40D. However, it should be noted that it is not necessary for the TRU 1 to monitor both the amount of current $I_{TECA}$ emitted from the TECA 3 and the TPS output voltage $V_{TPS}$, because conditions in the internal line hydraulic fluid pressure may be detected or predicted through a number of alternative means. For instance, the TRU 1 might monitor only the current $I_{TECA}$ emitted from the TECA 3, or the TRU 1 might monitor the transmission's internal line hydraulic fluid pressure directly by utilizing an electronic pressure transducer. In addition, conditions in the internal line hydraulic fluid pressure might be predicted by monitoring the shift solenoids to determine the transmission shift points.

Figure 2:
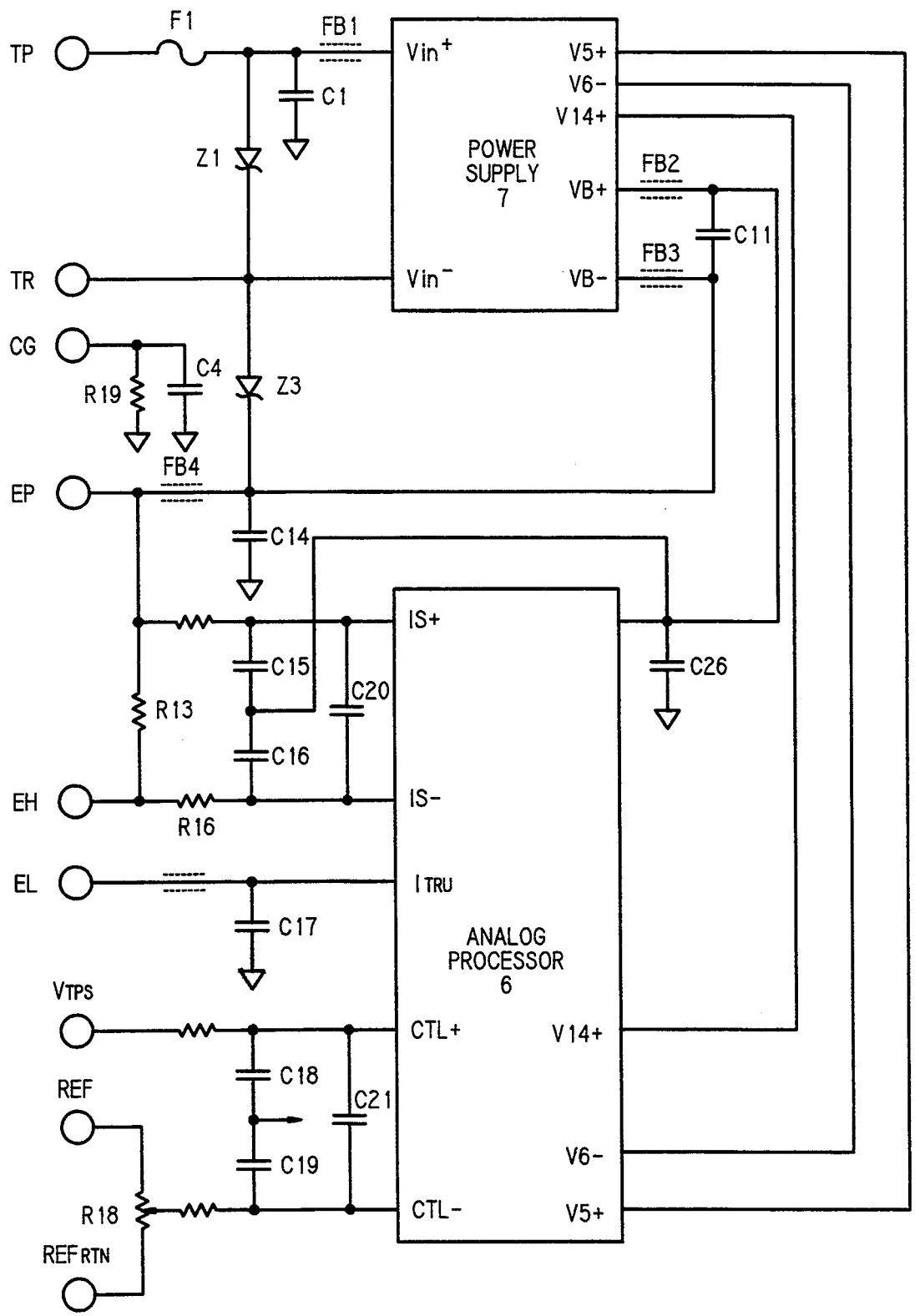
FIG. 2 is a schematic block diagram of the circuitry comprising a transmission recalibration unit of the invention including radio interference suppression elements.

Referring now to FIGS. 1 and 2, to monitor the amount of current $I_{TECA}$ emitted by the TECA 3, the TRU 1 diverts the flow of the current $I_{TECA}$ emitted from the TECA 3, and forces the diverted current $I_{TECA}$ to pass through a current sensing resistor R13. Thus, the voltage $V_{R13}$ developed across the current sensing resistor R13 is proportional to the current $I_{TECA}$ emitted from the TECA 3. As shown in FIG. 2, the voltage $V_{R13}$ developed across the current sensing resistor R13 is fed through a low pass filter to the IS terminals of an analog processor 6 located within the TRU 1.

Referring again to FIGS. 1 and 2, to monitor the voltage $V_{TPS}$ generated by the TPS sensor 5 the terminals $V_{TPS}$, REF, and $REF_{RTN}$ of the TRU 1 are connected to the TECA 3. In addition, a potentiometer R18 is provided between TRU terminals REF and $REF_{RTN}$ creating a wiper or variable reference voltage $V_{R18}$. Thus, as illustrated, the TPS sensor voltage $V_{TPS}$ and the variable reference voltage $V_{R18}$ form a voltage differential $V_{DIFF}$ which is fed through a low pass filter to the CTL terminals of the analog processor 6. In the preferred form the potentiometer R18 is adjusted such that the variable reference voltage $V_{R18}$ constitutes 40% of the REF voltage. Thus, the voltage differential $V_{DIFF}$ will have a positive value only when the TPS sensor voltage $V_{TPS}$ exceeds 40% of the REF voltage. Resistor $R_s$ provides a shift point adjustment depending upon the value of the resistance rates with the TPS sensor 5.

Figure 3:
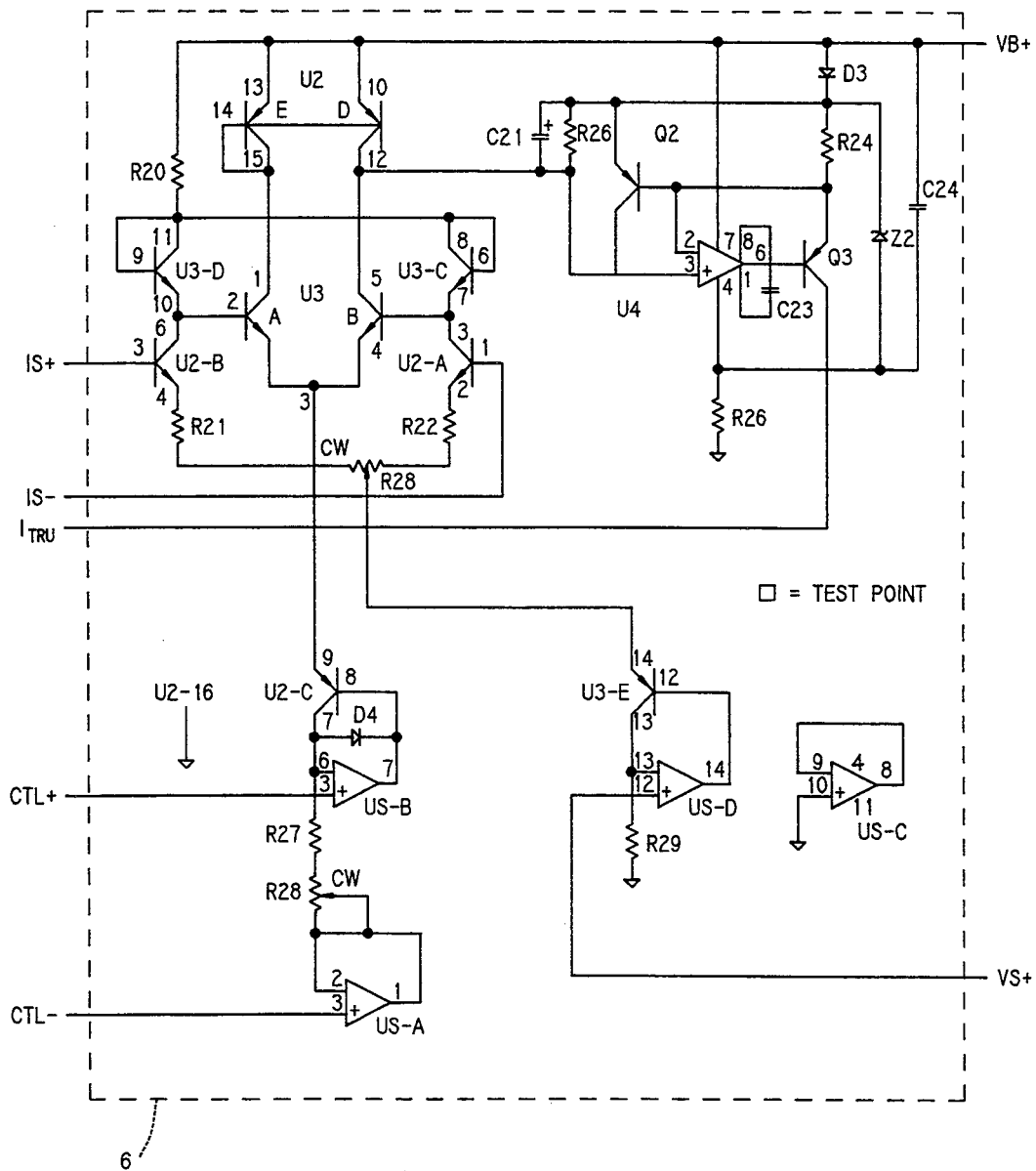
FIG. 3 is a circuit diagram of a preferred embodiment of an analog processor employed in the present invention.

Referring now to FIGS. 2 and 3, in the preferred form the analog processor 6 includes a one quadrant analog multiplier having two high impedance differential voltage inputs, IS and CTL, and a current source product output, $I_{TRU}$. Since the analog processor 6 operates in the first quadrant only, both inputs, IS and CTL, must be positive for the current $I_{TRU}$ generated by the TRU 1 to be non-zero. Hence, the voltage $V_{R13}$ across the current sensing resistor R13 and the voltage differential $V_{DIFF}$ between the TPS sensor voltage $V_{TPS}$ and the variable reference voltage $V_{R18}$ must be positive before the TRU 1 will generate any current.

It should be noted that the electrical characteristics of analog multipliers are generally known in the art, and that the analog processor 6, shown in detail in FIG. 3, is comprised of electronic components which may be readily purchased through electronic equipment suppliers. Therefore, an overview of the operation of the analog processor 6 and of the components which comprise it is provided below.

As discussed above, in the preferred form the analog processor 6 includes one quadrant analog multiplier with a scaled current mirror. The one quadrant analog multiplier has two high impedance voltage inputs, IS and CTL, and a current. source product output, $I_{TRU}$. As shown in FIG. 3, the voltage input IS is fed directly to the input of a differential amplifier employing NPN transistors U2-A and U2-B. This construction provides input common mode voltage rejection and produces a differential collector current proportional to the differential base voltage. In addition, emitter resistors R21 and R22 provide considerable local feedback, thus reducing input sensitivity and allowing for linear operation with large input voltages. Finally, a fixed operating current is pulled through the wiper of balance adjust potentiometer R23 by a current sink, which is comprised of operational amplifier U5-D, NPN transistor U3-E, and resistor R29. Thus, when the base differential voltage (the voltage differential at input IS) is zero, current flows equally through transistors U2-A and U2-B.

The differential collector current produced by transistors U2-A and U2-B is converted into a small logarithmic differential voltage by the emitter-base junctions of diode connected NPN transistors U3-C and U3-D, and the logarithmic differential voltage produced is fed to the input of a second differential amplifier formed by transistors U3-A and U3-B. The differential amplifier formed by transistors U3-A and U3-B is operated as a two quadrant transconductance multiplier. Thus, at a given differential base voltage, the magnitude of the differential collector current will be directly proportional to the operating current. In essence, the input signal is multiplied by the operating current of the differential amplifier.

The operating current of the differential amplifier formed by transistors U3-A and U3-B is controlled by a variable current sink which is controlled by the differential voltage at the CTL input of the analog processor 6, and which is comprised of operational amplifiers U5-A and US-B, NPN transistor U2-C, diode D4, and resistors R27 and R28. Thus, because the differential voltage at the IS input controls the logarithmic differential voltage applied to the differential amplifier formed by transistors U3-A and U3-B, and because the operating current of the differential amplifier formed by transistors U3-A and U3-B is controlled by the voltage differential input at the CTL input, the magnitude of the differential collector current will be roughly proportional to the product of the differential inputs, IS and CTL.

Because the differential amplifier formed by transistors U3-A and U3-B does not utilize emitter feedback, the response to the differential base voltage exhibits an exponential non-linearity, but this effect is compensated by the previously discussed logarithmic nature of the differential base voltage.

Turning now to the generation of the current source product output, $I_{TRU}$, PNP transistors U2-E and U2-D form a current mirror that converts the U3-A and U3-B differential collector current to a single bipolar current. This bipolar current comprises an input to a scaled current mirror, and is available at the connection of the collectors of transistors U2-D and U3-B. As shown in FIG. 3, the scaled current mirror comprises an operational amplifier U4, transistors Q2 and Q3, diode D3, zener diode Z2, resistors R26, R24, and R25, and capacitors C22, C23, and C24. The scaled current mirror sources a large, unipolar, output current, $I_{TRU}$, which is proportional to an input current sunk by the multiplier circuitry discussed above. Thus, if current is sourced from the multiplier circuitry into the input of the scaled current mirror, the scaled current mirror will produce no current.

In the preferred form the present invention comprises an analog processor 6 and a power supply 7. The power supply 7 enables the TRU 1 to achieve a voltage VB+ in excess of the 12 volt vehicle battery voltage, and thus, to inject current, $I_{TRU}$, into the terminal T1 of the TECA 3 which receives current $I_{RET}$ from the EPV 4, despite the inductive nature of the EPV 4. The power supply 7 is isolated between input and output.

The power supply 7 comprises a flyback type high frequency switching power supply which is constructed around a Silicon General SG3524 PWM regulator integrated circuit. Because the power supply 7 is of a type generally known in the art, an analysis of the power supply's function is not provided herein. Further, it should be noted that a vast number of circuit designs might be employed to generate the excess voltage required by the TRU 1.

Although in the preferred form an analog processor 6 controls the injection of current into the TECA 3, the current injection might alternatively be regulated by a digital circuit. Once converted to digital signals, the voltage differential inputs IS and CTL could be multiplied by a microprocessor, and the microprocessor could then determine the proper current output response.

What is claimed is:

1. A method for recalibrating internal hydraulic fluid pressure of an electronically controlled transmission comprising the steps of:
    (a) monitoring a control signal transmitted by an electronic control system to an electronic pressure valve;
    (b) monitoring an engine load control signal;
    (c) generating a first electronic signal proportional to said control signal;
    (d) generating a second electronic signal proportional to said engine load control signal;
    (e) multiplying said first electronic signal by said second electronic signal to obtain a product;
    (f) generating an injection signal proportional to said product when said first and second electronic signals both have positive values; and
    (g) injecting said injection signal into a feedback signal transmitted from said electronic pressure valve to said electronic control system.

2. The method of claim 1 wherein said engine load control signal has a predetermined maximum value, and said second electronic signal has a positive value when said engine load control signal exceeds a predetermined percentage of said predetermined maximum value.

3. The method of claim 1 wherein said engine load control signal is an output signal generated by a throttle position sensor.

4. A recalibration device for recalibrating internal hydraulic fluid pressure of an electronically controlled transmission, said recalibration device comprising a signal processor having at least one input comprising a voltage generated by passing a current generated by an electronic pressure valve output of an electronic control system through a current sensing resistor and an output, said at least one input connected to an electronic pressure valve output of an electronic control system, said output connected to a feedback line from said electronic pressure valve to said electronic control system, said signal processor generating and injecting an injection signal into said feedback line responsive to at least said at least one input.

5. The recalibration device of claim 4 wherein said signal processor further comprises a second input, said second input connected to an output of an engine load sensor, said signal processor generating and injecting said injection signal into said feedback line responsive to at least said at least one input and said second inputs.

6. The recalibration device of claim 5 wherein said engine load sensor is a throttle position sensor generating an output voltage proportional to throttle position.

7. The recalibration device of claim 5 wherein said signal processor comprises a first quadrant multiplier and an output driver circuit, said first quadrant multiplier connected to said at least one input and said second inputs, said output driver circuit connected to and controlled by said first quadrant multiplier, said output driver circuit connected to said signal processor output.

8. A recalibration device for recalibrating internal hydraulic fluid pressure of an electronically controlled transmission, said recalibration device comprising a signal processor having a first and second inputs and an output, said first input connected to an electronic pressure valve output of an electronic control system, said second input comprising a voltage differential between an output voltage of an engine load sensor and a predetermined reference voltage, said output connected to a feedback line from said electronic pressure valve to said electronic control system, said signal processor generating and injecting an injection signal into said feedback line responsive to at least said first and second inputs.

9. A recalibration device for recalibrating internal hydraulic fluid pressure of an electronically controlled transmission, said recalibration device comprising:
    a signal processor having at least one input and an output, said at least one input connected to an electronic pressure valve output of an electronic control system, said output connected to a feedback line from an electronic pressure valve to said electronic control system, said signal processor generating and injecting an injection signal into said feedback line responsive to at least said at least one input; and a power supply electrically connected to said signal processor, and electrically connected to an external supply voltage, said power supply capable of delivering a voltage in excess of said external supply voltage to said signal processor for injecting said injection signal into said feedback line from said electronic pressure valve.

* * * * *